(12) United States Patent
Iwanami

(10) Patent No.: US 12,214,492 B2
(45) Date of Patent: Feb. 4, 2025

(54) INFORMATION PROCESSING DEVICE AND STORAGE MEDIUM

(71) Applicant: SONY GROUP CORPORATION, Tokyo (JP)

(72) Inventor: Hiroshi Iwanami, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 671 days.

(21) Appl. No.: 17/451,511

(22) Filed: Oct. 20, 2021

(65) Prior Publication Data

US 2022/0032482 A1    Feb. 3, 2022

Related U.S. Application Data

(63) Continuation of application No. 16/306,014, filed as application No. PCT/JP2017/009708 on Mar. 10, 2017, now Pat. No. 11,185,998.

(30) Foreign Application Priority Data

Jun. 14, 2016    (JP) .................................. 2016-118014

(51) Int. Cl.
 B25J 19/02    (2006.01)
 B25J 9/00    (2006.01)
 B25J 9/16    (2006.01)
 B25J 11/00    (2006.01)

(52) U.S. Cl.
 CPC ........... B25J 19/026 (2013.01); B25J 9/0003 (2013.01); B25J 9/1666 (2013.01); B25J 9/1676 (2013.01); B25J 11/0005 (2013.01)

(58) Field of Classification Search
 CPC ...... B25J 19/026; B25J 9/0003; B25J 9/1666; B25J 9/1676; B25J 11/0005; B25J 11/008; G08B 25/04; G06N 99/00
 See application file for complete search history.

(56) References Cited

U.S. PATENT DOCUMENTS

| 4,558,321 A | 12/1985 | Kago et al. |
|---|---|---|
| 2002/0102526 A1 | 8/2002 | Tsukamoto |
| 2005/0138385 A1 | 6/2005 | Friedli et al. |
| 2007/0033050 A1 | 2/2007 | Asano et al. |
| 2011/0231216 A1 | 9/2011 | Fyke et al. |

(Continued)

FOREIGN PATENT DOCUMENTS

| CA | 2885731 A1 | 3/2014 |
|---|---|---|
| CN | 104813378 A | 7/2015 |

(Continued)

OTHER PUBLICATIONS

Office Action for JP Patent Application No. 2018-523317, issued on Sep. 29, 2020, 03 pages of Office Action and 03 pages of English Translation.

(Continued)

*Primary Examiner* — Basil T. Jos
(74) *Attorney, Agent, or Firm* — CHIP LAW GROUP

(57) ABSTRACT

There is provided an information processing device including a passive ultrasonic sensor, a notification section that notifies a user, and a control section that, when detecting a feature indicating approach of an object learned in advance from sensor data detected by the ultrasonic sensor, controls the notification section to notify the user.

18 Claims, 17 Drawing Sheets

(56) References Cited

U.S. PATENT DOCUMENTS

| | | |
|---|---|---|
| 2014/0108019 A1 | 4/2014 | Ehsani et al. |
| 2014/0234815 A1 | 8/2014 | Jang et al. |
| 2014/0282645 A1 | 9/2014 | Hammond |
| 2015/0109128 A1* | 4/2015 | Fadell ............... G08B 25/008 340/540 |
| 2015/0116106 A1 | 4/2015 | Fadell et al. |

FOREIGN PATENT DOCUMENTS

| | | |
|---|---|---|
| CN | 106255866 A | 12/2016 |
| EP | 2972113 A1 | 1/2016 |
| EP | 3136055 A1 | 3/2017 |
| JP | 2001-093062 A | 4/2001 |
| JP | 2002-006784 A | 1/2002 |
| JP | 2002-519741 A | 7/2002 |
| JP | 2002-222083 A | 8/2002 |
| JP | 2003-256042 A | 9/2003 |
| JP | 3126203 U | 10/2006 |
| JP | 2008-142876 A | 6/2008 |
| JP | 2014-180912 A | 9/2014 |
| JP | 2015-532075 A | 11/2015 |
| WO | 2014/047501 A1 | 3/2014 |
| WO | 2014/143936 A1 | 9/2014 |
| WO | 2015/162949 A1 | 10/2015 |

OTHER PUBLICATIONS

International Search Report and Written Opinion of PCT Application No. PCT/JP2017/009708, issued on May 23, 2017, 07 pages of translation and 07 pages of ISRWO.

International Preliminary Report on Patentability of PCT Application No. PCT/JP2017/009708, issued on Dec. 27, 2018, 07 pages of English Translation and 04 pages of IPRP.

Non-Final Office Action for U.S. Appl. No. 16/306,014, issued on Feb. 22, 2021, 53 pages.

Notice of Allowance for U.S. Appl. No. 16/306,014, issued on Jul. 30, 2021, 08 pages.

\* cited by examiner

FIG. 6

| NUMBER | DISCRIMINATION CONTENT | NOTIFICATION CONTENT |
|---|---|---|
| 1 | COURIER DELIVERY PERSON IS HEADED TOWARD ENTRANCE DOOR | "A courier delivery person is coming soon" |
| 2 | NEWSPAPER CARRIER IS HEADED TOWARD ENTRANCE DOOR | "A newspaper carrier is coming soon" |
| 3 | SOMEONE IS COMING TO ENTRANCE DOOR | "Someone is coming" |
| 4 | GARBAGE TRUCK IS COMING | "A garbage truck is coming" |
| 5 | SOMEONE IS IN BACKYARD | "There is a feel that someone is in the backyard" |
| ...... | ...... | ...... |

FIG. 10

| NUMBER | MAC Address | TERMINAL HOLDER |
|---|---|---|
| 1 | 12:34:AB:CD | COURIER DELIVERY PERSON a |
| 2 | 56:78:EF:EF | MAIL CARRIER |
| 3 | 98:76:FE:DC | HUSBAND |
| | ...... | ...... |

FIG. 14

| NUMBER | TYPE OF SMELL | TARGET PERSON |
|---|---|---|
| 1 | • SMELL OF UNIFORM CLEANING<br>• SMELL OF VEHICLE | COURIER DELIVERY PERSON b |
| 2 | • SMELL OF SOME SWEAT<br>• SMELL OF EAU DE COLOGNE FOR DISGUISING SMELL OF SWEAT | HUSBAND |
| ... | ... | ... |

INFORMATION PROCESSING DEVICE AND STORAGE MEDIUM

CROSS REFERENCE TO RELATED APPLICATIONS

This application is a continuation application of U.S. patent application Ser. No. 16/306,014, filed on Nov. 30, 2018, which is a U.S. National Phase of International Patent Application No. PCT/JP2017/009708 filed on Mar. 10, 2017, which claims priority benefit of Japanese Patent Application No. JP 2016-118014 filed in the Japan Patent Office on Jun. 14, 2016. Each of the above-referenced applications is hereby incorporated herein by reference in its entirety.

TECHNICAL FIELD

The present disclosure relates to an information processing device and a storage medium.

BACKGROUND ART

There is a bad timing for everything, and as is often the case, a courier delivery person may come as soon as one enters the bathroom, so one has to go out in a hurry, or one may be late in putting out the garbage missing a feel of a garbage truck although one is intending to be careful about the feel so as to put out the garbage before the garbage truck comes, for example. In a general detached house, it is relatively possible to sense ambient sounds and feels even in the house, and one can sense a feel that a vehicle stops on the road out front, sounds of opening the gate and walking up the approach, a feel of a person in the backyard, and the like, for example, even indoors.

Here, provision of various services offered by robots have recently been proposed. For example, Patent Literature 1 below describes a system of, at a place where unspecified people visit, accurately recognizing a person to be targeted for a service offered by a robot, and offering visitors services such as information provision, assistance, and further, security, guidance to escape from a fire, and the like, according to the circumstances. The robot used in such a system has a microphone and a speaker, and is capable of autonomously moving. When autonomously moving, the robot moves to a destination automatically avoiding an obstacle with an obstacle sensor through infrared sensing or ultrasonic sensing.

In addition, Patent Literature 2 below describes a security robot that runs by means of a running section to patrol a building. In the case where such a security robot finds a fallen person, an injured person, an intruder, or the like during patrol, an operator waiting at another place can have a conversation with the fallen person, injured person, or intruder with the speaker and microphone provided for the security robot. In addition, the security robot is provided with a contact sensor that senses contact of an obstacle during running and an ultrasonic sensor that perceives approach of a neighboring obstacle, an intruder, or the like.

In addition, Patent Literature 3 below describes a floating-type robot that recognizes a specific person and includes a display device that displays image information to be useful in the case where the specific person utilizes that place in the immediate vicinity of the specific person. Such a floating-type robot has a sound sensor for an audible range or ultrasonic range. The sound sensor inputs an ultrasonic echo issued from a sound generation device or a sound issued by another floating-type robot, and on the basis of the signal or the like, an obstacle or the other floating-type robot can be sensed.

In addition, Patent Literature 4 below describes an electronic pet and a security device that can pretend as if there is a watchdog by reading a change in environmental state from a sensor, a microphone, and a security camera, or the like, and making a response with a sound quality and a sound in accordance with the situation. Such an electronic pet is an electronic pet in which a physical life object does not exist, and detects, with a physical sensor, an object's motion, smell, atmospheric pressure, temperature, vibrations, smoke, humidity, or the like as an environmental state.

In addition, Patent Literature 5 below describes analyzing a sound generated by a sound generator attached to a person in accordance with the person's motion to control a toy. In addition, it is described that the generated sound includes ultrasound, and as an alternative or additionally, may include infrasound.

In addition, Patent Literature 6 below describes a security walking robot in which a plurality of ultrasonic sensors, each of which senses an obstacle ahead and measures the distance to the obstacle, are provided on the side surfaces and the front side of the body.

CITATION LIST

Patent Literature

Patent Literature 1: JP 2008-142876A
Patent Literature 2: JP 2003-256042A
Patent Literature 3: JP 2002-006784A
Patent Literature 4: JP 2001-093062A
Patent Literature 5: JP 2002-519741T
Patent Literature 6: JP 3126203U

DISCLOSURE OF INVENTION

Technical Problem

However, none of Patent Literatures described above considers a robot that senses a feel of a human or an object outside the house although describing robots that sense an approaching object in the vicinity with sensors that sense an obstacle.

Thus, the present disclosure proposes an information processing device and a storage medium capable of sensing approach of an object and notifying a user in advance.

Solution to Problem

According to the present disclosure, there is proposed an information processing device including: a passive ultrasonic sensor; a notification section configured to notify a user; and a control section configured to, when detecting a feature indicating approach of an object learned in advance from sensor data detected by the ultrasonic sensor, control the notification section to notify the user.

The present disclosure proposes a storage medium having a program stored thereon that causes a computer to function as a control section that, when detecting a feature indicating approach of an object learned in advance from sensor data detected by a passive ultrasonic sensor, controls a notification section so as to notify a user.

Advantageous Effects of Invention

According to the present disclosure as described above, it is possible to sense approach of an object and notify a user in advance.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 6 is a diagram describing an example of discrimination contents and notification contents according to one embodiment of the present disclosure.

FIG. 10 is a diagram showing an example of a MAC address list according to one embodiment of the present disclosure.

FIG. 14 is a diagram showing an example of a smell list according to one embodiment of the present disclosure.

MODE(S) FOR CARRYING OUT THE INVENTION

Figure 1:
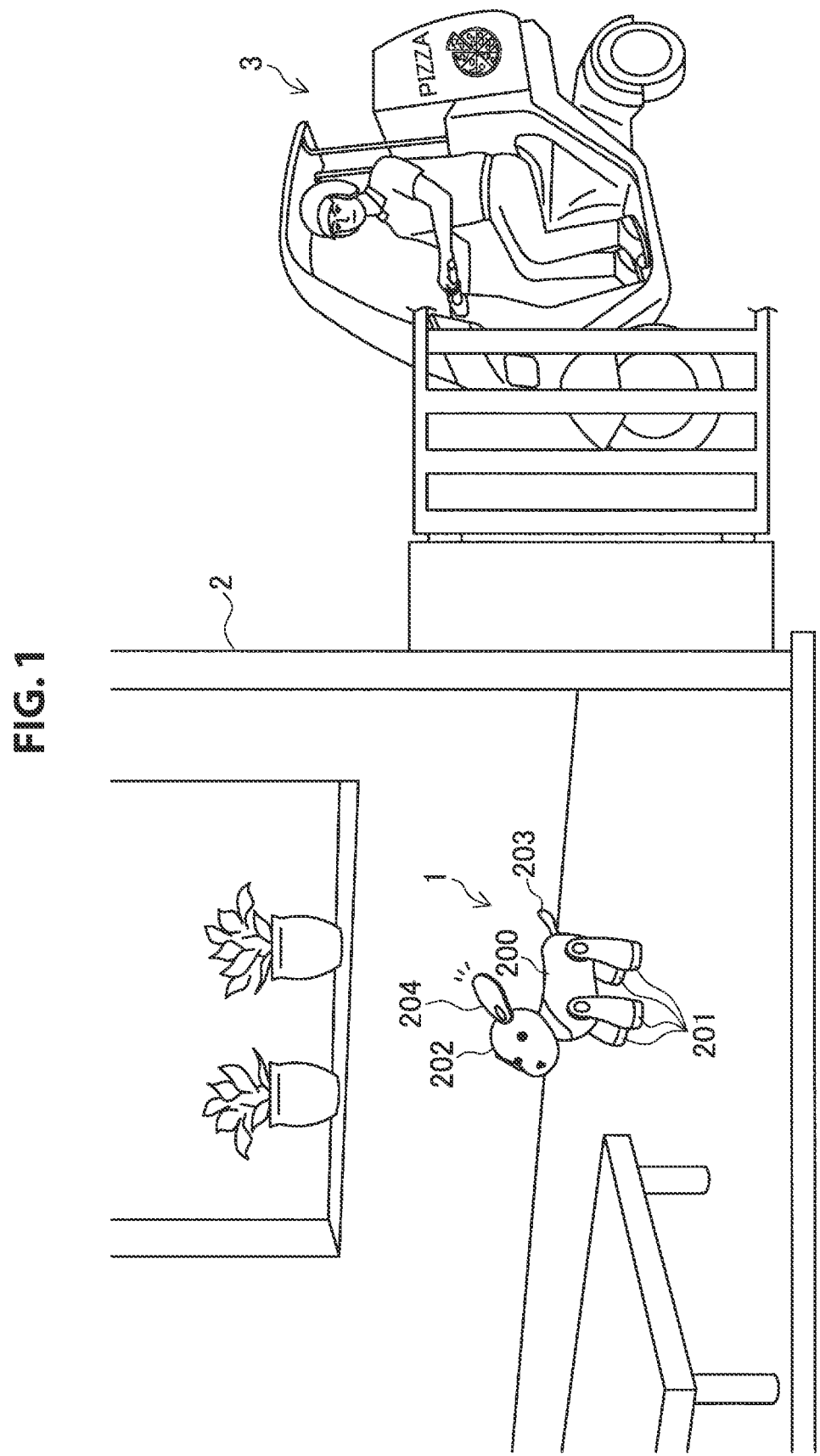
FIG. 1 is a diagram describing an overview of an information processing system according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided in the following order.

1. Overview of information processing system according to one embodiment of present disclosure
2. Configuration
3. Operation processing
3-1. Generation processing
3-2. Notification processing
4. Application examples
4-1. Notification processing through use of radio waves
4-2. Notification processing through use of smell
4-3. Operation processing in accordance with emotion
5. Conclusion

1. OVERVIEW OF INFORMATION PROCESSING SYSTEM ACCORDING TO ONE EMBODIMENT OF PRESENT DISCLOSURE

First, an overview of an information processing system according to one embodiment of the present disclosure will be described. FIG. 1 is a diagram describing an overview of the information processing system according to the present embodiment. As shown in FIG. 1, the information processing system according to the present embodiment is implemented by a pet robot 1 (information processing device) having an entertainment nature, whose appearance has a shape formed simulating an animal such as a dog. In addition, the pet robot 1 is capable of autonomously moving eyes, legs, and the like to exhibit animal-like behaviors.

BACKGROUND

Here, in the daily life, one may have to answer a suddenly coming visitor in a hurry without being ready. In a general detached house, it is relatively possible to sense ambient sounds and feels even in the house, but as is often the case, although being careful about the sound of a motorbike thinking about when pizza delivery comes, for example, one may be late in noticing the sound while being distracted with another thing unintentionally. In addition, even in a condominium, it is possible to open the window to listen to an external downstairs sound and sense a feel, but it is inconvenient to leave the window open all the time.

Thus, the information processing system according to the present embodiment is capable of sensing approach of an object early and notifying a user using the pet robot 1 having various sensors and having an excellent sensory organ. In general, the human audible range is approximately 12 Hz to 23 KHz, while the audible range of dogs, for example, is approximately 15 Hz to 60 KHz. High-frequency acoustic waves are significantly produced by hitting sounds (stones, paving stones, touching sounds of gatepost metal) or the like in the case where an object is rubbed (rustling, footsteps, a rubbing sound when opening the gate). Therefore, by providing the pet robot 1 with a frequency sensor to sense these sounds, it is possible to sense approach of a person or an object in the vicinity and to notify the user in advance.

This allows the user to become aware of the visit early and make preparations. In addition, in the case where an intruder or a suspicious person at the back door or in the garden is sensed early, the user can take appropriate measures immediately to ensure security and safety. In addition, if it is clarified who the visitor is, it is possible to make a choice of not answering the door in some cases.

As shown in FIG. 1, for example, the pet robot 1 present in a house 2 plays a watchdog-like role of sensing a feel of a person or an object in the vicinity including the outside of the house 2 mainly with a passive ultrasonic sensor and notifying the user. In the example shown in FIG. 1, the pet robot 1 senses a sound of a motorbike 3 approaching the house 2 with the ultrasonic sensor, and notifies the user. Specifically, in the case of pizza delivery, for example, the doorbell is pressed after a sound that the motorbike 3 comes running, a sound of stopping in front of the house 2, a sound of taking out pizza from a carrier, a sound of preparing for a slip, footsteps headed for the entrance door, a sound of walking on gravel or a stone pavement of the approach, and a sound of standing in front of the entrance door are heard, and the user becomes aware that the pizza delivery has come. The pet robot 1 can sense a series of these sounds (mainly, ultrasound) at an early stage, and capture sound frequency features and a sound chronological pattern to notify the user that "A pizza delivery person is coming soon" before the pizza delivery person reaches the entrance door. The user having received the notification can make preparations in advance, such as a preparation of a charge for pizza.

An overview of the information processing system according to the present embodiment has been described above. Note that, in the present embodiment, the pet robot 1 is used as an example of the information processing device, whilst the present embodiment is not limited to this, but may be an imaginary entity displayed on a display terminal such as a tablet terminal or a smartphone, for example, that is, a tiny robot based on a software program.

Next, a configuration of the pet robot 1 which is an example of the information processing device according to the present embodiment will be specifically described with reference to FIG. 2.

2. CONFIGURATION

Figure 2:
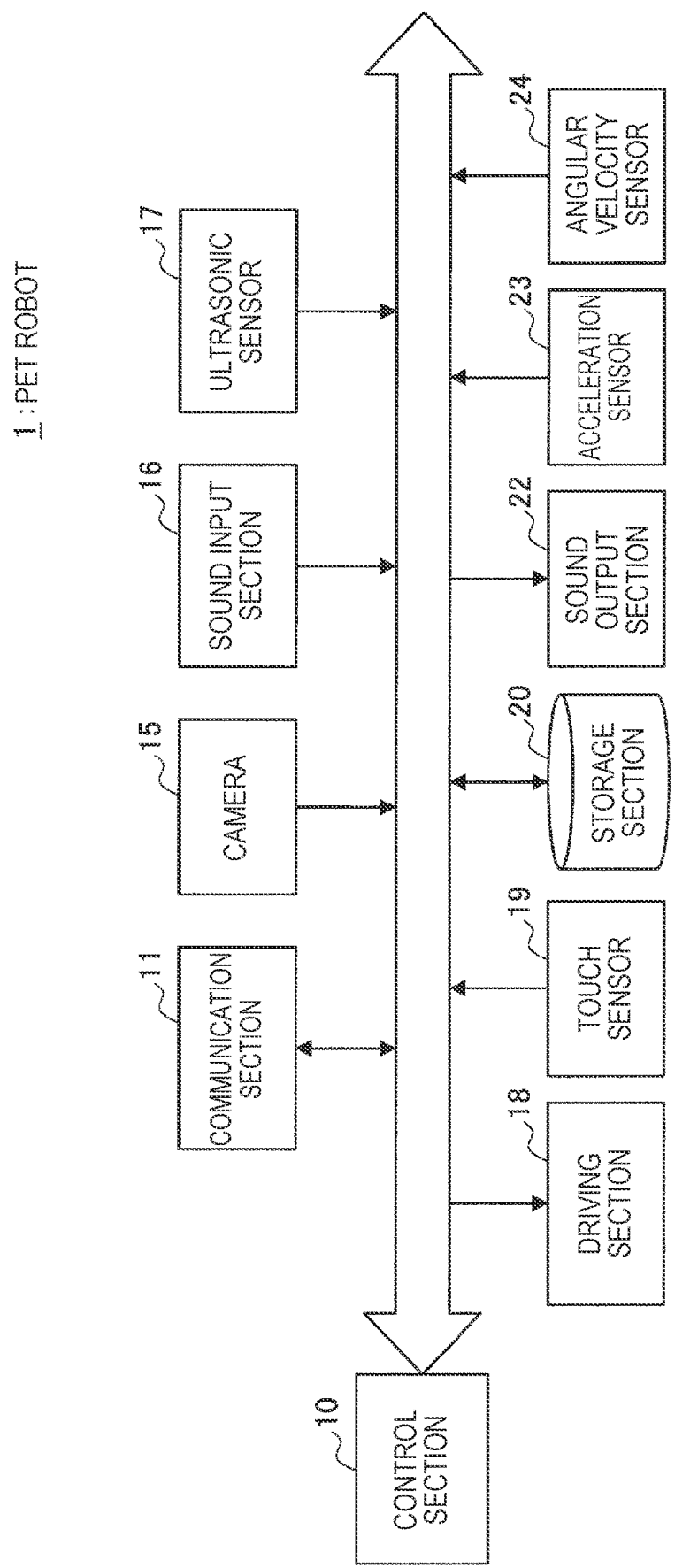
FIG. 2 is a block diagram showing an example of a configuration of a pet robot according to one embodiment of the present disclosure.

FIG. 2 is a block diagram showing an example of a configuration of the pet robot 1 according to the present embodiment. As shown in FIG. 2, the pet robot 1 has a control section 10, a communication section 11, a camera 15, a sound input section 16, an ultrasonic sensor 17, a driving section 18, a touch sensor 19, a storage section 20, a sound output section 22, an acceleration sensor 23, and an angular velocity sensor 24.

The control section 10 functions as an arithmetic processing device and a control device, and controls the overall operations in the pet robot 1 in accordance with various programs. The control section 10 is implemented by, for example, an electronic circuit such as a central processing unit (CPU) or a microprocessor. In addition, the control section 10 may include a read only memory (ROM) that stores programs, operation parameters, and the like to be used and a random access memory (RAM) that temporarily stores parameters and the like varying as appropriate.

In addition, the control section 10 according to the present embodiment may perform autonomous control of automatically operating in accordance with various types of information obtained from the communication section 11, the camera 15, the sound input section 16, the ultrasonic sensor 17, the touch sensor 19, the acceleration sensor 23, the angular velocity sensor 24, or the like.

The communication section 11 is a communication module for transmitting/receiving data to/from another device. For example, the communication section 11 is connected to various types of servers via a network (not shown) to transmit/receive data, or is directly connected to a peripheral device (not shown) by Bluetooth (registered trademark) or Wi-Fi (registered trademark) to transmit/receive data.

The camera 15 has a lens system including an imaging lens, an aperture, a zoom lens, a focus lens, and the like, a driving system that causes the lens system to perform a focusing operation and a zooming operation, a solid-state image sensor array that photoelectrically converts imaged light obtained by the lens system to generate an imaging signal, and the like. The solid-state image sensor array may be implemented by, for example, a charge coupled device (CCD) sensor array or a complementary metal oxide semiconductor (CMOS) sensor array.

The sound input section 16 collects a user's voice or an ambient environmental sound, and outputs a sound signal to the control section 10. The sound input section 16 is implemented by a microphone, a microphone amplifier section that subjects a sound signal obtained with the microphone to amplification processing, and an A/D converter for subjecting the sound signal to digital conversion, and outputs the sound signal to the control section 10.

The ultrasonic sensor 17 is a passive sensor that receives ambient ultrasound, and outputs a sensed ultrasound signal to the control section 10.

The driving section 18 is a functional module for achieving the degree of freedom at each joint of the pet robot 1, and includes a plurality of driving units provided respectively for axes such as roll, pitch, and yaw at each joint. Each of the driving units includes a combination of a motor that performs a rotation operation about a predetermined axis, an encoder that detects a rotated position of the motor, and a driver that adaptively controls the rotated position and rotational speed of the motor on the basis of the output of the encoder.

The touch sensor 19 detects a pressure applied by a physical action from the user, such as "patting" or "clapping". Note that the pet robot 1 may have a pressure sensor instead of or in addition to the touch sensor 19.

The storage section 20 stores programs for the control section 10 to execute various types of processing, and the like. In addition, the storage section 20 includes a storage device including a storage medium, a recording device that records data on the storage medium, a readout device that reads out data from the storage medium, a deletion device that deletes data recorded on the storage medium, and the like.

The sound output section 22 is implemented by a speaker and an amplifier circuit for that speaker. In addition, the sound output section 22 outputs a sound such as a cry.

The acceleration sensor 23 and the angular velocity sensor 24 detect the orientation and motion acceleration of the pet robot 1.

A configuration of the pet robot 1 according to the present embodiment has been specifically described above. Note that the configuration of the pet robot 1 according to the present embodiment is not limited to the example shown in FIG. 2, but may further have a positional information acquisition section that measures the position of the pet robot 1, for example.

In addition, the pet robot 1 may use the camera 15 described above as a distance sensor for measuring the distance to an object positioned ahead, or may separately include a distance sensor through use of a system of infrared rays or the like.

In addition, the pet robot 1 may include a body unit 200, leg units 201 respectively coupled to the front, back, left, and right of the body unit 200, and a head unit 202 and a tail unit 203 respectively coupled to the front end and the back end of the body unit 200, as shown in FIG. 1, for example. In the body unit 200, the control section 10 formed by connecting a central processing unit (CPU), a dynamic random access memory (DRAM), a flash read only memory (ROM), a personal computer (PC) card interface circuit, and a signal processing circuit to one another via an internal bus and a battery as a power source of the pet robot 1 are stored. In addition, in the body unit 200, the communication section 11, the ultrasonic sensor 17, the storage section 20, the acceleration sensor 23, the angular velocity sensor 24, and the like are also stored.

In addition, in the head unit 202, the camera 15 for imaging an external situation, the touch sensor 19 for detecting a pressure applied by a physical action from the user, such as "patting" or "clapping", the sound input section 16 for collecting external sounds, the sound output section 22 for outputting a sound such as a cry, a distance sensor (not shown) for measuring the distance to an object positioned ahead, and the like are arranged at predetermined positions, respectively. The camera 15 may be provided at a position equivalent to an "eye" of the pet robot 1. In addition, the camera 15 may be arranged in the forehead portion of the head unit 202, and a light emitting diode (LED) (not shown) may be arranged at a position equivalent to an "eye". In addition, an ear unit 204 is coupled to the head unit 202, and is capable of moving in the case where approach of a person or an object is sensed by the ultrasonic sensor 17.

Further, actuators and potentiometers of the number of degrees of freedom are placed at a joint portion of each of the leg units 201, each coupled portion between each of the leg units 201 and the body unit 200, a coupled portion between the head unit 202 and the body unit 200, a tail coupled portion of the tail unit 203, and the like, respectively. For example, the actuator has a servo motor as a component. The leg units 201 are controlled by driving of the servo motor to transition to a target attitude or operation.

Regarding a specific configuration example of the pet robot 1 described above, a reference is made to JP 2002-157596A, for example. The entire contents of JP 2002-157596A are hereby incorporated by reference.

In addition, the configuration of the pet robot 1 described with reference to FIG. 2 is also applicable to the case in which the pet robot 1 is a tiny robot. Specifically, a display terminal displaying the tiny robot has components equivalent to a display section, that is, the above-described control section 10, the communication section 11, the camera 15, the sound input section 16, the ultrasonic sensor 17, the touch sensor 19, the storage section 20, and the sound output section 22. The tiny robot is displayed on the display section, and may interact with the user.

(Functional Configuration)

Figure 3:
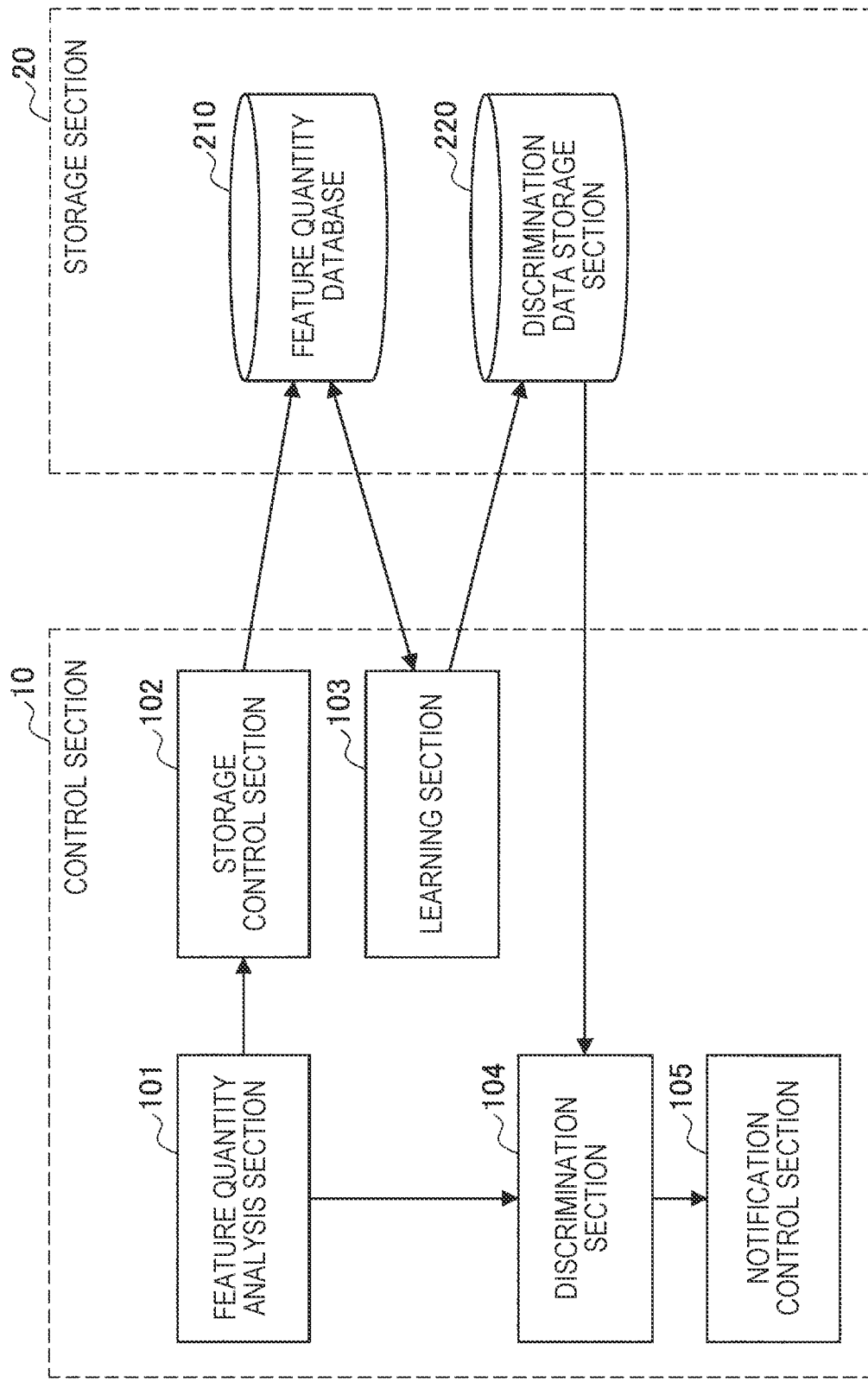
FIG. 3 is a block diagram showing a functional configuration example of a control section and a storage section according to one embodiment of the present disclosure.

Next, a functional configuration of the control section 10 and the storage section 20 will be described with reference to FIG. 3. FIG. 3 is a block diagram showing a functional configuration example of the control section 10 and the storage section 20 according to one embodiment of the present disclosure. In the drawing, a feature quantity analysis section 101, a storage control section 102, a learning section 103, a discrimination section 104, and a notification control section 105 are shown as functions of the control section 10 of the pet robot 1. In addition, in the drawing, a feature quantity database 210 and a discrimination data storage section 220 are shown as functions of the storage section 20. Hereinafter, the respective structural elements will be described further.

The feature quantity analysis section 101 continually analyzes signals (ultrasonic signals) sensed and input by the ultrasonic sensor 17, and outputs an analysis result (also referred to as feature quantity data) to the storage control section 102 and the discrimination section 104. The method of analyzing signals is not particularly limited, but Fast Fourier Transform (FFT) analysis or cepstrum analysis in several milliseconds to several tens of milliseconds, for example, may be used.

The storage control section 102 exerts control so as to store the ultrasonic feature quantity data analyzed by the feature quantity analysis section 101 in the feature quantity database 210. Since analyses are conducted continually in the feature quantity analysis section 101, and feature quantity data is output as an analysis result, the storage control section 102 exerts control so as to continually store the feature quantity data in the feature quantity database 210.

The learning section 103 machine-learns feature quantity data indicating approach of an object such as a visitor or a suspicious person, or a moving body (for example, a vehicle, motorbike, bicycle, drone) on the basis of chronological feature quantity data stored in the feature quantity database 210, and generates discrimination data for discriminating among these objects. Specifically, in the case where a command (voice command) that "It was a courier delivery. Tell me if he comes next" is input from a user, the learning section 103, for example, calls feature quantity data since a time point going back a predetermined time T (for example, 30 seconds) from the feature quantity database 210, and generates discrimination data that senses that the courier delivery has come. Such discrimination data may be chronological feature quantity data having been patterned. The learning section 103 stores the generated discrimination data in the discrimination data storage section 220 as teacher data. Here, generation of discrimination data based on chronological feature quantity data will be described with reference to FIG. 4.

Figure 4:
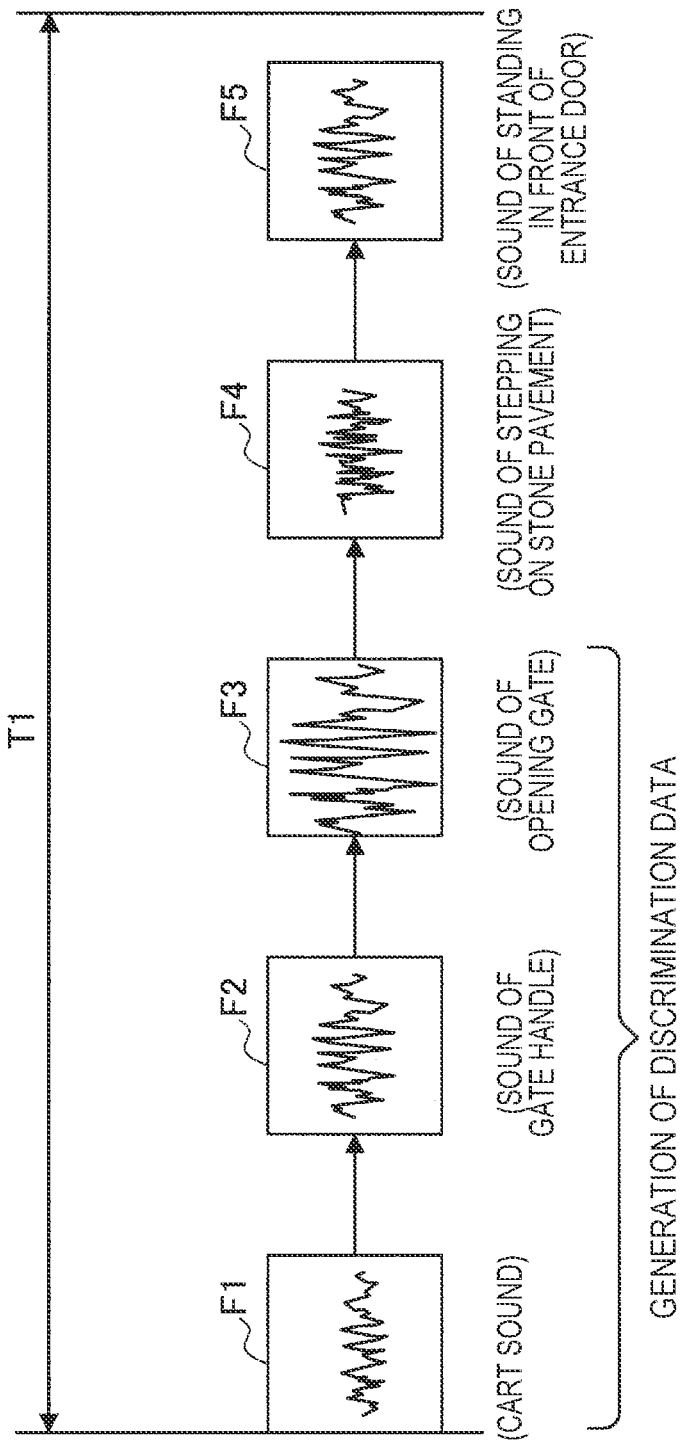
FIG. 4 is a diagram showing an example of chronological feature quantity data according to one embodiment of the present disclosure.

FIG. 4 is a diagram showing an example of chronological feature quantity data according to the present embodiment. In FIG. 4, feature quantity data F1, F2, F3, F4, and F5 since a time point going back a predetermined time T1, read out from the feature quantity database 210 upon receipt of a command from the user, are shown in chronological order. In the feature quantity database 210, a cart sound when a courier delivery person comes, a sound of a gate handle, a sound of opening the gate, a sound of stepping on a stone pavement, and a sound of standing in front of the entrance door are stored as chronological feature quantity data. The learning section 103 generates discrimination data for discriminating the courier delivery on the basis of the feature quantity data F1, F2, and F3 since a time point going back the predetermined time T, for example. Accordingly, it may be discriminated by the discrimination section 104 which will be described later that a courier delivery person has come at the time point when the cart sound (feature quantity data F1), the sound of the gate handle (feature quantity data F2), and the sound of opening the gate (feature quantity data F3) occur successively.

Note that what event each piece of feature quantity data indicates may be classified by analyzing feature quantity data accumulated in the feature quantity database 210 or discrimination data accumulated in the discrimination data storage section 220, or matching with sound event data acquired from a network. For example, the learning section 103 can classify the feature quantity data F1 as the cart sound, the feature quantity data F2 as the sound of the gate handle, the feature quantity data F3 as the sound of opening the gate, the feature quantity data F4 as the sound of stepping on the stone pavement, the feature quantity data F5 as the sound of standing in front of the entrance door, and the like in the example shown in FIG. 4.

Figure 5:
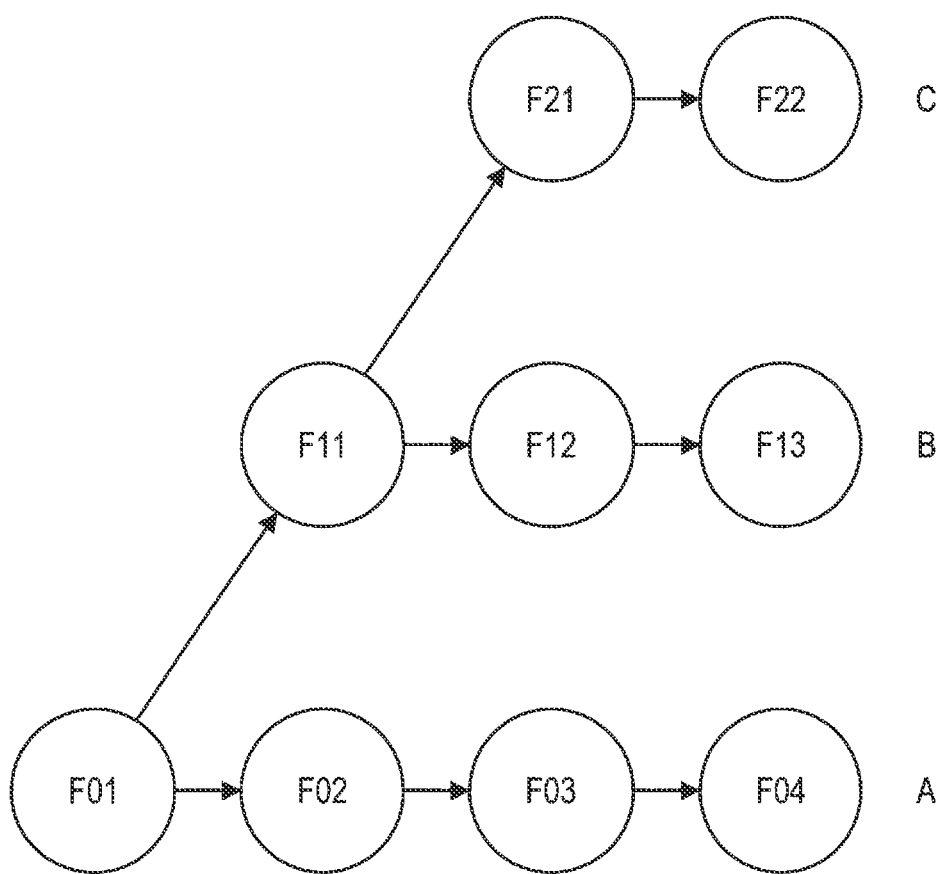
FIG. 5 is a diagram showing an example of an event state transition according to one embodiment of the present disclosure.

In the case where events can be classified, the control section 10 is capable of grasping a state transition of a sound event on the basis of accumulated feature quantity data and discrimination data. Here, FIG. 5 shows an example of an event state transition according to the present embodiment. In the case where a state transition as shown in FIG. 5 has been grasped, it is determined that an approaching visitor, moving body, or the like is highly likely to be an object A when a sound event transitions in the order of F01, F02, F03, and F04, and that an object B is highly likely to be approaching when the sound event transitions in the order of F01, F11, F12, and F13. In addition, it is determined that an object C is highly likely to be approaching when the sound event transitions in the order of F01, F11, F21, and F22. Note that, in the case where each event is calculated as one point, for example, and the total sum exceeds a threshold value in accordance with the event transition, it may be determined that a corresponding object is highly likely to be approaching. In addition, each event may be weighted.

The discrimination section 104 compares feature quantity data analyzed by the feature quantity analysis section 101 and each piece of discrimination data stored in the discrimination data storage section 220, determines whether or not there is similarity, and discriminates an approaching object such as a visitor. That is, the discrimination section 104 detects a feature indicating approach of an object learned in advance from an ultrasonic signal detected by the ultrasonic sensor 17. The technique for determining similarity is not particularly limited, but a technique such as the Hidden Markov Model (HMM), for example, for comparing two patterns having different speeds or timings in similarity is used.

In addition, in the case where a state transition of a sound event has been grasped as described with reference to FIG. 5, the discrimination section 104 is also capable of recognizing the sound event on the basis of feature quantity data, and discriminating an approaching object in accordance with the state transition of the sound event.

In the case where it is discriminated by the discrimination section 104 that there is similarity, the notification control section 105 exerts control so as to notify the user about a notification content in accordance with a discrimination content. Notification to the user may be performed by sound output from the sound output section 22, for example. Information regarding the notification content may be stored in the storage section 20 in advance, or may be acquired from a network via the communication section 11. Alternatively, the information regarding the notification content may be generated by the control section 10 concurrently when generating discrimination data, and may be stored in the storage section 20. Here, an example of discrimination contents and notification contents according to the present embodiment will be described with reference to FIG. 6.

FIG. 6 shows a notification content per discrimination content. In the case of a discrimination content that a courier delivery person is headed toward the entrance door, for example (that is, in the case where currently acquired ultrasonic feature quantity data has similarity to discrimination data indicating that a courier delivery person is headed toward the entrance door) as shown in FIG. 6, a notification content such as "A courier delivery person is coming soon" is output by sound. In addition, in the case of a discrimination content that a newspaper carrier is headed toward the entrance door, for example, a notification content such as "A newspaper carrier is coming soon" is output by sound.

The feature quantity database 210 stores feature quantity data analyzed by the feature quantity analysis section 101 in chronological order. In addition, the feature quantity database 210 may fix a storage period of feature quantity data, and the feature quantity data may be overwritten with new feature quantity data after the lapse of the storage period.

The discrimination data storage section 220 stores discrimination data generated by the learning section 103. The discrimination data is used as teacher data when discriminating an approaching object in the discrimination section 104.

The functional configuration of the control section 10 and the storage section 20 according to the present embodiment has been specifically described above. Next, operation processing of the information processing system according to the present embodiment will be described with reference to FIG. 7 to FIG. 8.

3. OPERATION PROCESSING

<3-1. Generation Processing>

Figure 7:
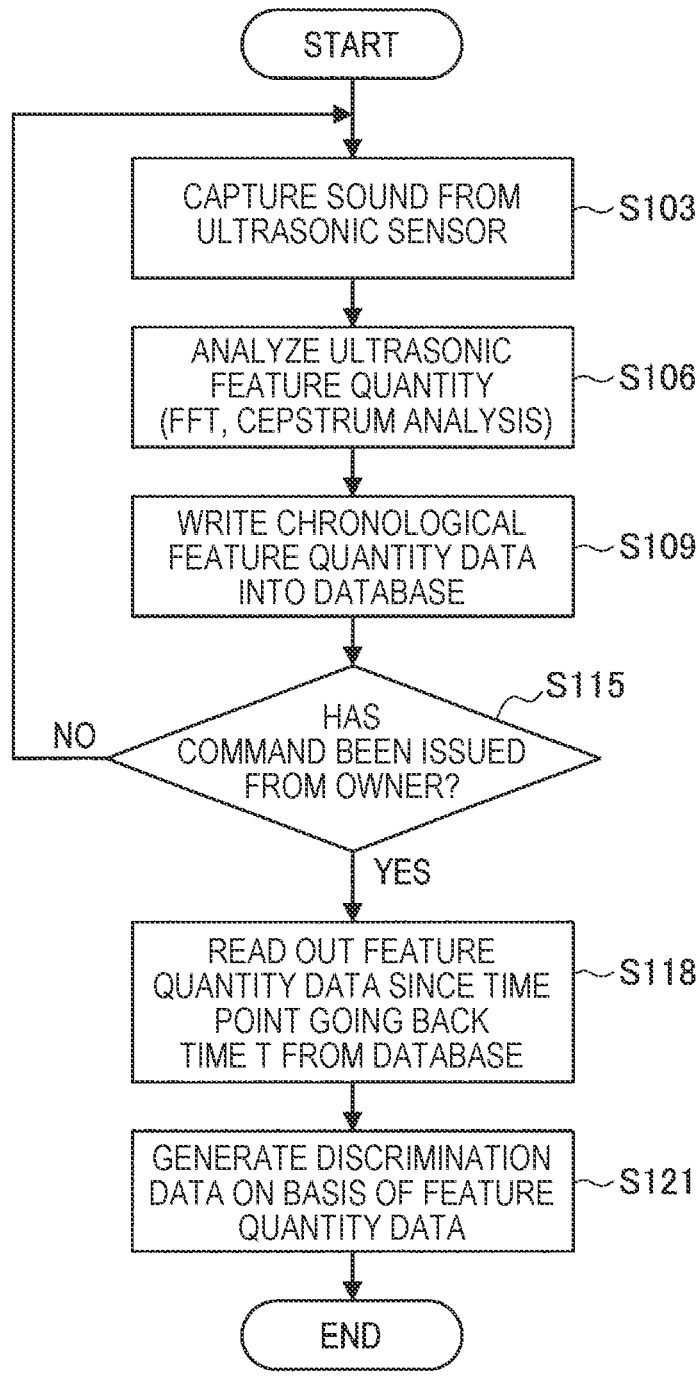
FIG. 7 is a flowchart showing identification data generation processing according to one embodiment of the present disclosure.

FIG. 7 is a flowchart showing identification data generation processing according to the present embodiment. As shown in FIG. 7, the pet robot 1 first captures a sound from the ultrasonic sensor 17 (step S103).

Next, the feature quantity analysis section 101 performs a feature quantity analysis for a captured ultrasonic signal (step S106).

Then, the feature quantity analysis section 101 writes the analyzed chronological feature quantity data into the feature quantity database 210 (step S109).

The above-described sound capturing, analysis of feature quantity data, and writing are performed continuously all the time (for example, every 2 to 3 minutes).

Next, in the case where a command has been issued from the owner (user) (step S115/Yes), the learning section 103 reads out feature quantity data since a time point going back the predetermined time T from the feature quantity database 210 (step S118). The command from the owner is based on, for example, voice such as "Tell me if he comes next" or a specific gesture. The control section 10 analyzes the user uttered voice acquired by the sound input section 16, for example, to recognize the command. The learning section 103 reads out feature quantity data since 1 minute to 10 seconds or the like before the timing when a previously visited visitor, for example, presses the doorbell in accordance with the command.

Then, the learning section 103 generates discrimination data for discriminating the visitor when the same visitor comes next on the basis of the read-out feature quantity data (step S121). The generated discrimination data is stored in the discrimination data storage section 220.

Next, notification processing through use of the generated discrimination data will be described with reference to FIG. 8.

<3-2. Notification Processing>

Figure 8:
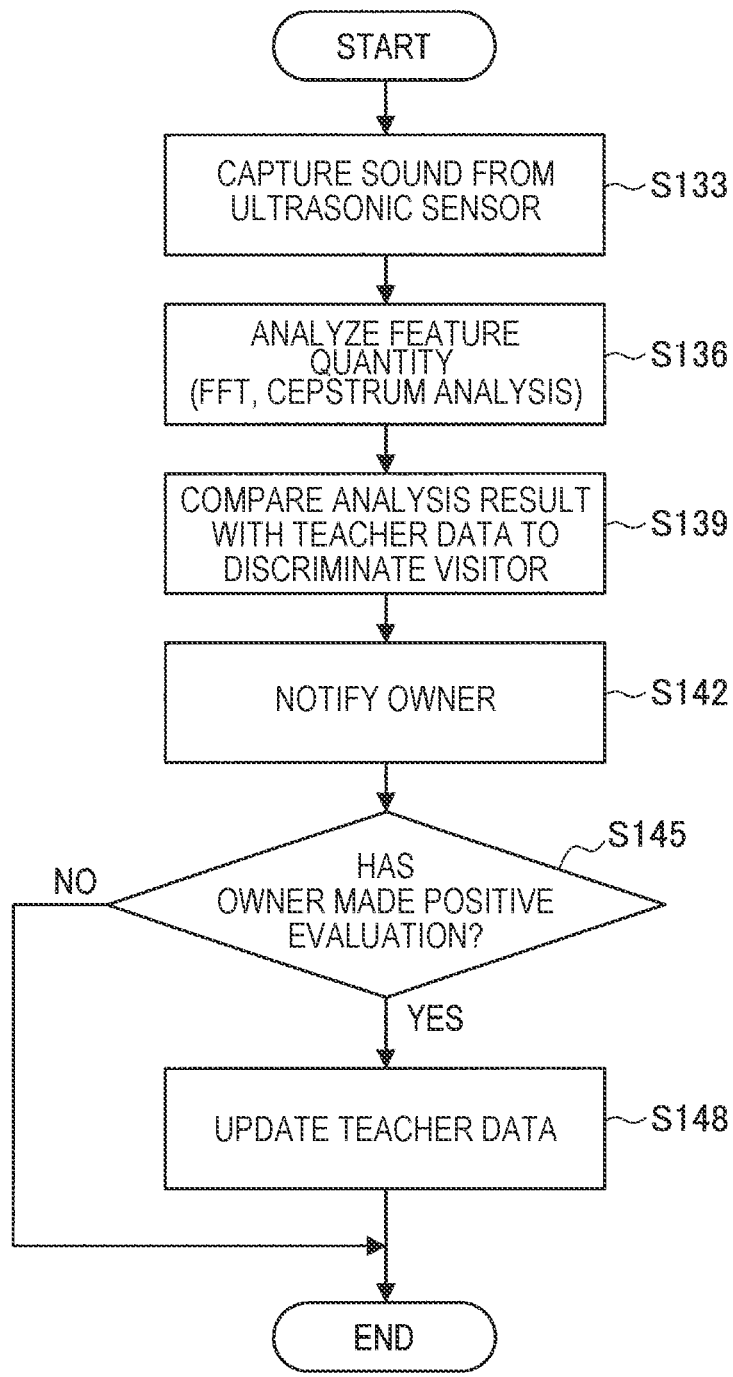
FIG. 8 is a flowchart showing notification processing according to one embodiment of the present disclosure.

FIG. 8 is a flowchart showing notification processing according to the present embodiment. As shown in FIG. 8, the pet robot 1 first captures a sound from the ultrasonic sensor 17 (step S133).

Next, the feature quantity analysis section 101 analyzes a feature quantity for a captured ultrasonic signal (step S136).

Then, the discrimination section 104 compares feature quantity data as the analysis result and discrimination data stored in the discrimination data storage section 220 to discriminate a visitor (step S139).

The above-described feature quantity data analysis and discrimination are performed continuously all the time (for example, every 2 to 3 minutes), and in the case where there is similarity to any piece of discrimination data, the discrimination section 104 outputs a discrimination result to the notification control section 105.

Next, the notification control section 105 notifies the owner (user) on the basis of the discrimination result (step S145). For example, in the case where it is discriminated that a courier delivery person has come, the notification control section 105 controls the sound output section 22 to output by sound that "A courier delivery person has come!".

Next, in the case where the owner has made a positive evaluation (step S145/Yes), the learning section 103 updates teacher data (step S148). Examples of the positive evaluation from the owner include an utterance indicating that the notification was correct, a praising action, a specific gesture, and the like, such as saying that "OK, it was a courier delivery" and patting the pet robot 1 saying "Thank you for your help". In this case, the learning section 108 regenerates and improves discrimination data used for discrimination on the basis of this feature quantity data.

Note that such user feedback is not limited to a positive evaluation, but a negative evaluation is also expected. Learning in the case where a negative feedback is given will be described below.

(Learning Based on Feedback)
Change in Notification Timing

For example, in the case where the timing when the pet robot 1 notified that "A courier delivery person is coming soon" was late when the courier delivery person came, the user gives the pet robot 1 feedback that "Tell me a little earlier".

Figure 9:
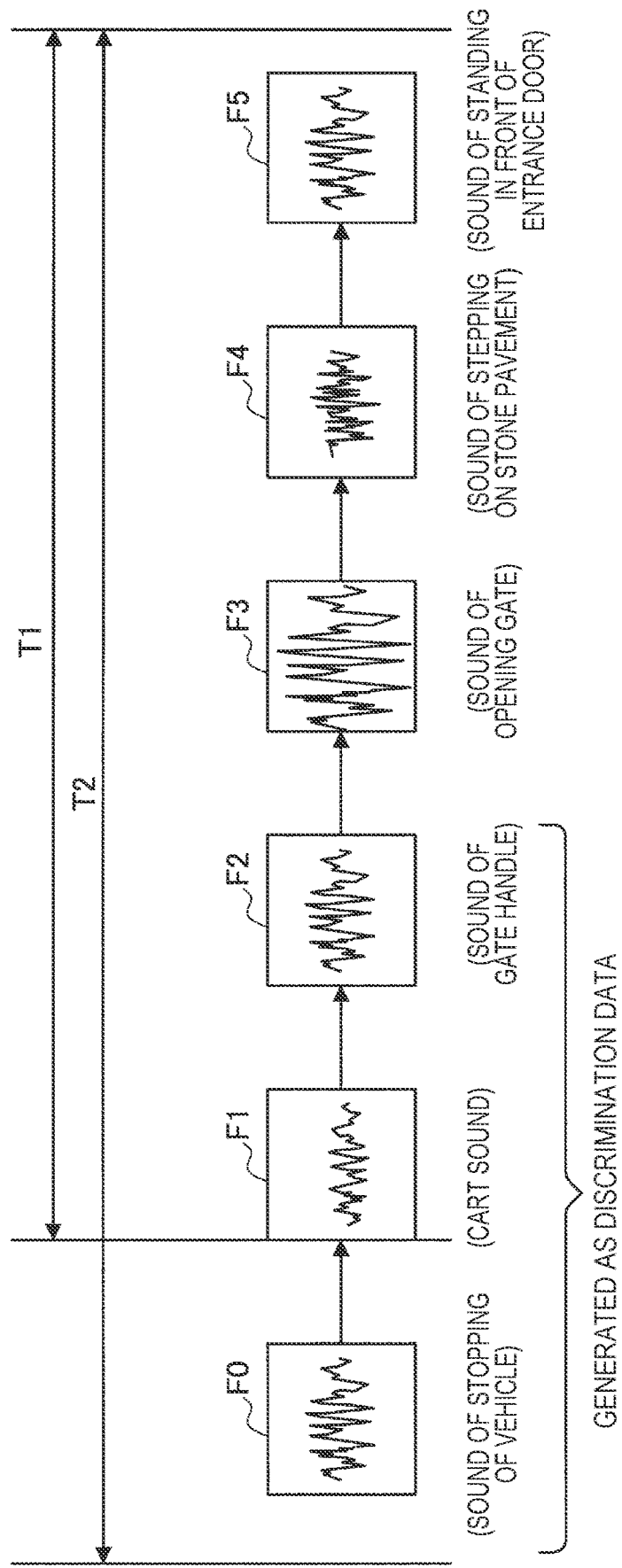
FIG. 9 is a diagram describing learning in accordance with feedback according to one embodiment of the present disclosure.

The pet robot 1 answers "OK", and improves discrimination data by means of the learning section 103 to be capable of notifying the user at an earlier timing. Specifically, for example, the learning section 103 generates discrimination data on the basis of feature quantity data F0, F1, and F2 since a time point going back a predetermined time T2, which is longer than the predetermined time T1, as shown in FIG. 9. Accordingly, in the example described with reference to FIG. 4, the user is notified at the time point when the feature quantity data F3 is sensed, while in the example shown in FIG. 9, a notification can be given at an earlier time point when the feature quantity data F2 is sensed.

In the Case of Incorrect Notification

For example, in the case where the pet robot 1 notified that "A courier delivery person is coming soon", but it was actually a newspaper carrier, the user gives the pet robot 1 feedback that "It was different", "It was a newspaper carrier", or the like.

In this case, the pet robot 1 refrains from performing the update processing shown in the above-described step S148. As described above, by regenerating discrimination data only in the case where positive feedback is given, it is possible to improve the accuracy of discrimination data.

4. APPLICATION EXAMPLES

In the above-described embodiment, the case of sensing ultrasound to discriminate a visitor or the like has been described, whilst the present embodiment is not limited to this, but it is also possible to sense approach of a visitor or the like by means of radio waves or a smell. Hereinafter, specific description will be provided with reference to FIG. 10 to FIG. 17.

<4-1. Notification Processing Through Use of Radio Waves>

It is assumed that a person visiting on business, such as a courier delivery person or a newspaper carrier, usually carries electronic equipment related to his/her business. It is assumed that he/she carries a mobile phone, smartphone, or tablet terminal, and in the case of a courier delivery person, equipment equivalent to a Point Of Sales (POS) terminal with a barcode scanner for managing deliveries. These types of electronic equipment are connected to a communication network directly or by way of a mobile phone terminal or smartphone using a wireless communication system such as Bluetooth, ANT, or Wi-Fi. It is assumed that even a suspicious person or an intruder carries some electronic equipment. In addition, even electronic equipment that does not actively emit radio waves discharges electro magnetic interference (EMI) pulses, referred to as unnecessary radiation, specific to the equipment.

The pet robot 1 according to the present embodiment is capable of discriminating a visitor by sensing WAN, Bluetooth, ANT, Wi-Fi, or unnecessary radiation emitted by such electronic equipment.

Specifically, for example, describing Wi-Fi as an example, Wi-Fi equipment has a terminal-specific ID referred to as a MAC address, and terminal equipment issues a signal referred to as a Probe Request in order to connect to an access point. Wi-Fi radio waves propagate a distance of usually about 10 m to 30 m depending on the environment, and the distance to the terminal equipment can be estimated by the strength of radio waves (RSSI).

The pet robot 1 according to the present embodiment is capable of receiving Wi-Fi radio waves with the communication section 11, acquiring a MAC address to be checked against an existing MAC address list, and distinguishing whether a stranger has just passed in front of the house, or a courier delivery person or an acquaintance has come.

Here, FIG. 10 shows an example of the MAC address list according to the present embodiment. FIG. 10 shows that a terminal holder whose MAC address is "12:34:AB:CD" is a "courier delivery person a", a terminal holder whose MAC address is "56:78:EF:EF" is a "mail carrier", and a terminal holder whose MAC address is "98:76:FE:DC" is "husband". The MAC address list may be stored in the storage section 20 in advance, or may be externally acquired via the communication section 11.

The pet robot 1 according to the present embodiment is capable of checking the MAC address acquired by receiving Wi-Fi radio waves against the MAC address list as shown in FIG. 10 to discriminate a visitor and notifying the user.

(Discrimination Processing Through Use of Radio Waves and Ultrasound)

In addition, the pet robot 1 according to the present embodiment is capable of narrowing down visitors using the MAC addresses, and then discriminating a visitor using ultrasound to increase the accuracy of discrimination. Since the MAC address is a specific ID, the likelihood of a discriminated person becomes absolutely high in the case where the discriminated person can be identified by Wi-Fi radio waves. In addition, radio waves are less attenuated as compared with ultrasound, and can be sensed remotely. Therefore, the accuracy can be increased by initially sensing a visitor by Wi-Fi radio waves useful in the case where the distance is far, and when the visitor approaches, identifying him/her by means of ultrasound. Such operation processing in the case of discriminating a visitor using both radio waves and ultrasound and notifying the user will be described below with reference to FIG. 11.

Figure 11:
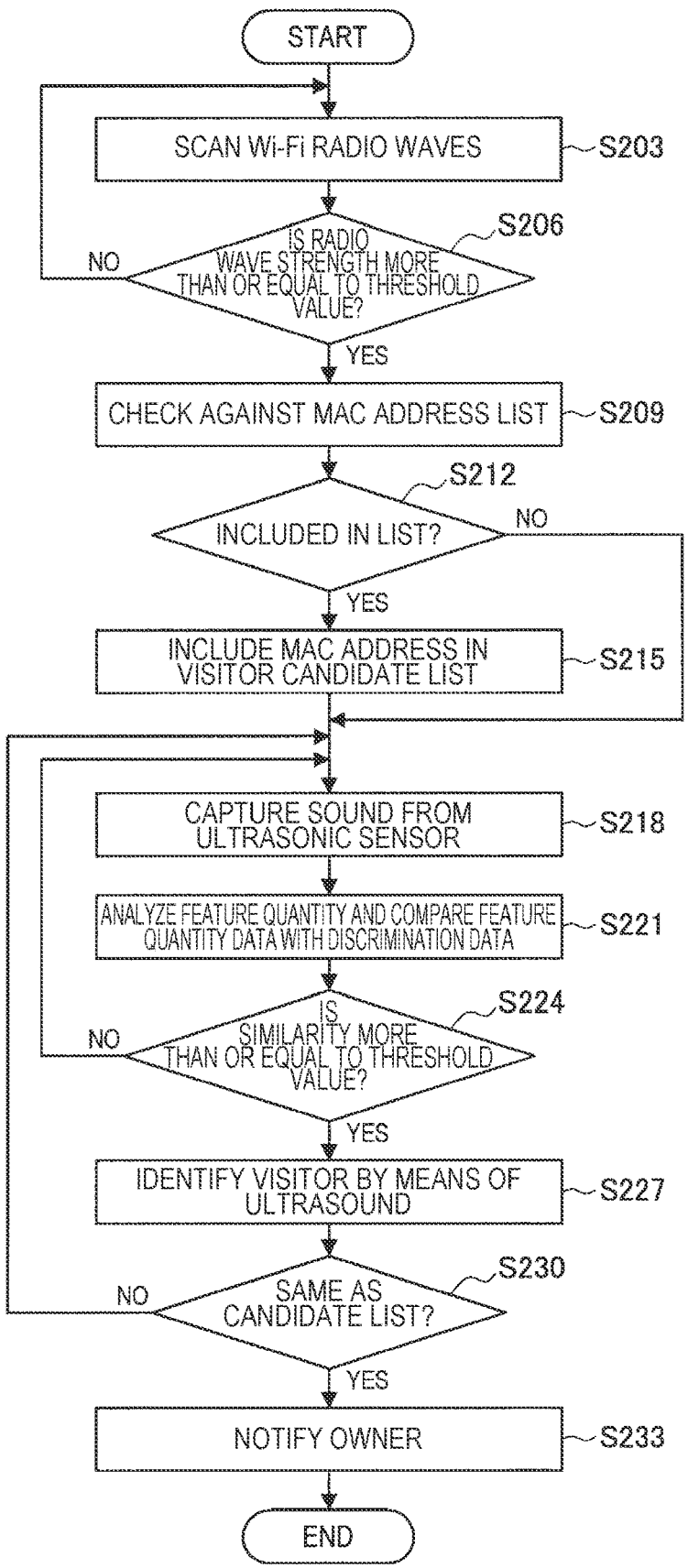
FIG. 11 is a flowchart showing notification processing through use of radio waves and ultrasound according to one embodiment of the present disclosure.

FIG. 11 is a flowchart showing notification processing through use of radio waves and ultrasound according to the present embodiment. In the example shown in FIG. 11, Wi-Fi is used as an example of received radio waves.

As shown in FIG. 11, first, the communication section 11 of the pet robot 1 scans Wi-Fi radio waves (step S203).

Next, in the case where the strength of Wi-Fi radio waves is more than or equal to a threshold value (step S206/Yes), the control section 10 checks a MAC address acquired by scanning against the MAC address list (step S209).

Then, in the case where the acquired MAC address is included in the list (step S212/Yes), the control section 10 includes the acquired MAC address on a visitor candidate list (step S215).

Next, the pet robot 1 captures a sound from the ultrasonic sensor 17 (step S218).

Then, the feature quantity analysis section 101 analyzes a feature quantity for a captured ultrasonic signal, and compares the analyzed feature quantity data and discrimination data stored in the discrimination data storage section 220 (step S221). In the comparison with the discrimination data, a determination of similarity (calculation of similarity) between the analyzed feature quantity data and the discrimination data may be performed.

Next, in the case where the similarity to the discrimination data is more than or equal to a threshold value (step S224/Yes), the discrimination section 104 performs visitor identification by means of ultrasound (step S227). That is, the discrimination section 104 discriminates a visitor on the basis of discrimination data whose similarity is more than or equal to the threshold value.

Next, in the case where the visitor identified by the discrimination section 104 is the same as the above-described candidate list (is included in the candidate list) (step S230/Yes), the notification control section 105 exerts control so as to notify the owner about the visitor (step S233). As described above, since Wi-Fi radio waves can be sensed more remotely than ultrasound which is a sound event, it is not clear if a person possessing an electronic terminal having the acquired MAC address just passes in front of the house, visits a neighboring house, or comes to the house where the pet robot 1 is present. Therefore, by sensing the person approaching the house with the ultrasonic sensor 17 and identifying him/her, the discrimination accuracy can be increased further.

The case of complementarily utilizing both radio waves and ultrasound to increase the accuracy of discrimination has been described above. Note that the method of complementarily utilizing the both is not limited to the example of using a MAC address (terminal-specific ID) described above, but it is also possible to increase the accuracy of discrimination by learning a co-occurrence relationship between an ultrasonic feature and radio wave signal detection, for example. Specific description will be provided below with reference to FIG. 12.

Figure 12:
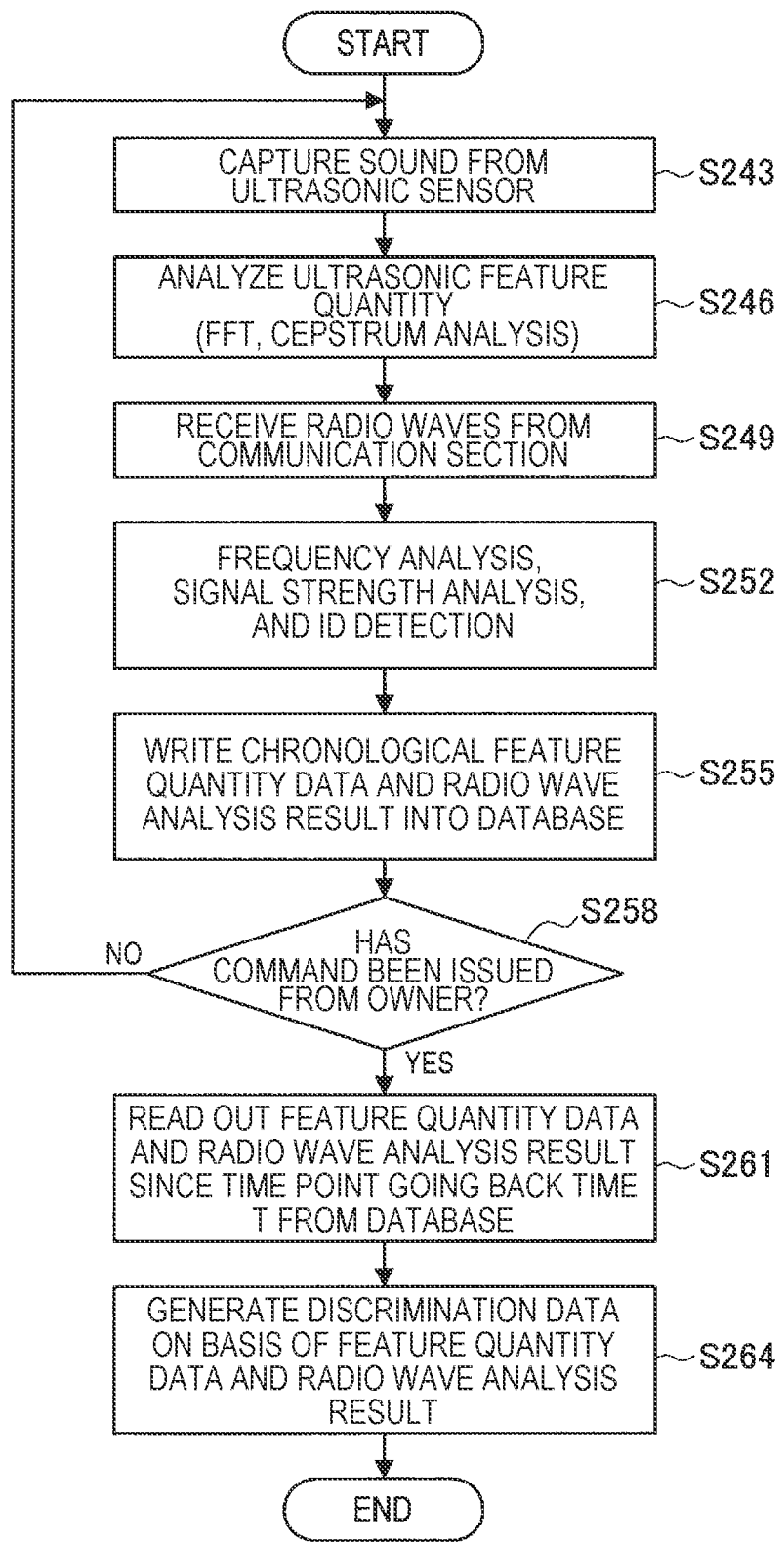
FIG. 12 is a flowchart showing processing of collecting chronological data of ultrasound and radio waves according to one embodiment of the present disclosure.

FIG. 12 is a flowchart showing processing of collecting chronological data of ultrasound and radio waves according to the present embodiment. As shown in FIG. 12, the pet robot 1 first captures a sound from the ultrasonic sensor 17 (step S243).

Next, the feature quantity analysis section 101 analyzes a feature quantity for a captured ultrasonic signal (step S246).

Then, radio waves are received by the communication section 11 (step S249), and the control section 10 performs a radio wave analysis such as a frequency analysis, signal strength analysis, and ID detection (step S252).

Next, the control section 10 writes the analyzed chronological feature quantity data and the radio wave analysis result into the feature quantity database 210 in association with each other (step S255).

The above-described sound capturing, analysis of feature quantity data, radio wave reception, radio wave analysis, and writing are performed continuously all the time (for example, every 2 to 3 minutes).

Next, in the case where a command has been issued from the owner (user) (step S258/Yes), the learning section 103 reads out feature quantity data and a radio wave analysis result since a time point going back the predetermined time T from the feature quantity database 210 (step S261).

Then, the learning section 103 generates discrimination data for discriminating a visitor when the same visitor comes next on the basis of the read-out chronological feature quantity data and radio wave analysis result (step S2641). The generated discrimination data is stored in the discrimination data storage section 220.

In the discrimination and notification processing through use of discrimination data generated in this manner, the acquired chronological ultrasonic feature quantity data and radio wave analysis result are compared with the discrimination data to distinguish whether or not there is similarity, and a visitor is discriminated, similarly to the case of using ultrasound described with reference to FIG. 8. In the present embodiment, by increasing the types of chronological patterns to be used for discrimination data and using more parameters in discrimination, the discrimination accuracy can be increased.

<4-2. Notification Processing Through Use of Smell>

Next, the case of sensing a person to be discriminated using a smell will be described with reference to FIG. 13 to FIG. 14. Although the smell often depends on the environment (season, whether the window is open or closed, wind direction) or the like, it is possible to discriminate a visitor when the pet robot 1 senses the smell and checks a smell list provided in advance.

Figure 13:
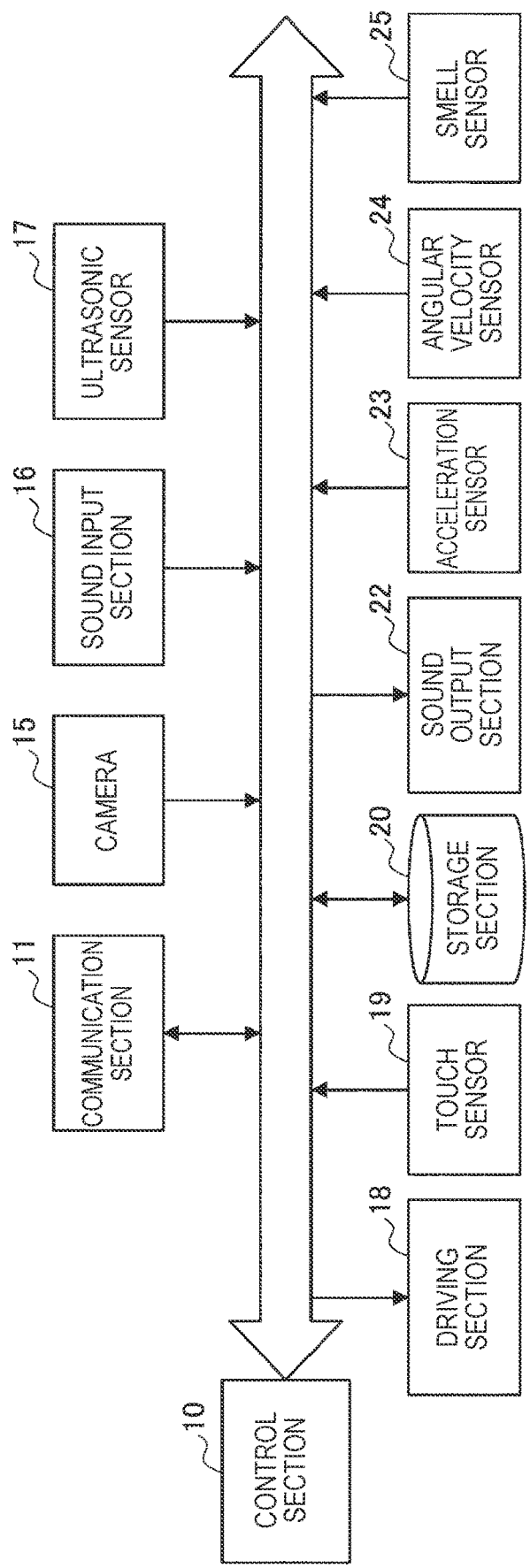
FIG. 13 is a block diagram showing an example of a configuration of a pet robot according to one embodiment of the present disclosure.

FIG. 13 is a block diagram showing an example of a configuration of a pet robot 1A according to an application example of the present embodiment. As shown in FIG. 13, the pet robot 1A has the control section 10, the communication section 11, the camera 15, the sound input section 16, the ultrasonic sensor 17, the driving section 18, the touch sensor 19, the storage section 20, the sound output section 22, the acceleration sensor 23, the angular velocity sensor 24, and a smell sensor 25.

The smell sensor 25 senses a surrounding smell, and outputs a sensing result to the control section 10.

In addition, a smell list is stored in the storage section 20. Here, an example of the smell list is shown in FIG. 14.

FIG. 14 shows that the case of the smell of uniform cleaning and the smell of a vehicle is "a courier delivery person", and the case of the smell of some sweat and the smell of eau de cologne for disguising the smell of sweat is "husband".

The control section 10 is capable of checking the smell list on the basis of the smell sensed by the smell sensor 25, discriminating a visitor, and notifying the user about the visitor from the sound output section 22 or the like.

In addition, the control section 10 is also capable of increasing the accuracy by discriminating the visitor using both ultrasound and a smell. Specifically, the control section 10, for example, is capable of identifying a visitor using ultrasound, and identifying the visitor further on the basis of a smell.

<4-3. Operation Processing in Accordance with Emotion>

Next, operation processing in accordance with an emotion of a user (owner) will be described. The pet robot 1 according to the present embodiment may recognize the user's face from a captured image captured by the camera 15, for example, to sense a user's emotion from a facial expression, or may sense a user's emotion from user's voice collected by the sound input section 16. The pet robot 1 is capable of performing automatic learning in accordance with the sensed user's emotion. Specific description will be provided below with reference to FIG. 15 to FIG. 17.

(Configuration)

Although detailed description will be omitted since an essential configuration of the pet robot 1 capable of sensing emotions is as shown in FIG. 2, a functional configuration different from the above-described embodiment will be described below with reference to FIG. 15.

Figure 15:
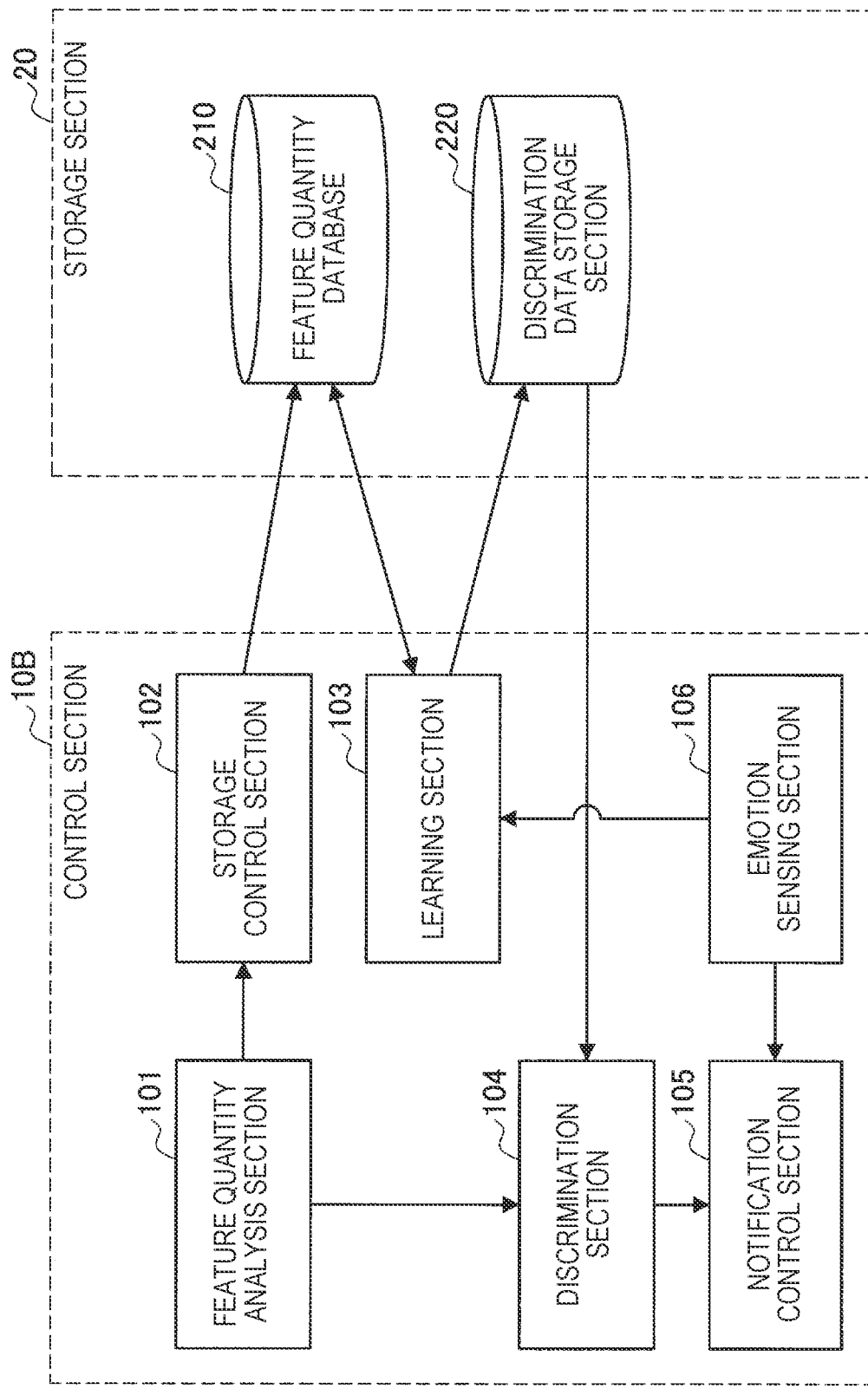
FIG. 15 is a block diagram showing a functional configuration example of a control section and a storage section of a pet robot according to one embodiment of the present disclosure.

FIG. 15 is a block diagram showing a functional configuration example of a control section 10B and the storage section 20 of the pet robot 1 according to the present embodiment. In the drawing, the feature quantity analysis section 101, the storage control section 102, the learning section 103, the discrimination section 104, the notification control section 105, and an emotion sensing section 106 are shown as functions of the control section 10B of the pet robot 1. In addition, in the drawing, the feature quantity database 210 and the discrimination data storage section 220 are shown as the functions of the storage section 20.

The emotion sensing section 106 senses (estimates) a user's emotion on the basis of data acquired by various sensors. Specifically, for example, the emotion sensing section 106 distinguishes an expression of the user's face on the basis of a captured image captured by the camera 15, and senses a user's emotion. In addition, the emotion sensing section 106 distinguishes a voice tone and utterance contents on the basis of the user's voice collected by the sound input section 16, and senses a user's emotion.

Operation processing performed by the control section 10B in accordance with the user's emotion sensing result obtained by such an emotion sensing section 106 will be specifically described below.

(Operation Processing)

Figure 16:
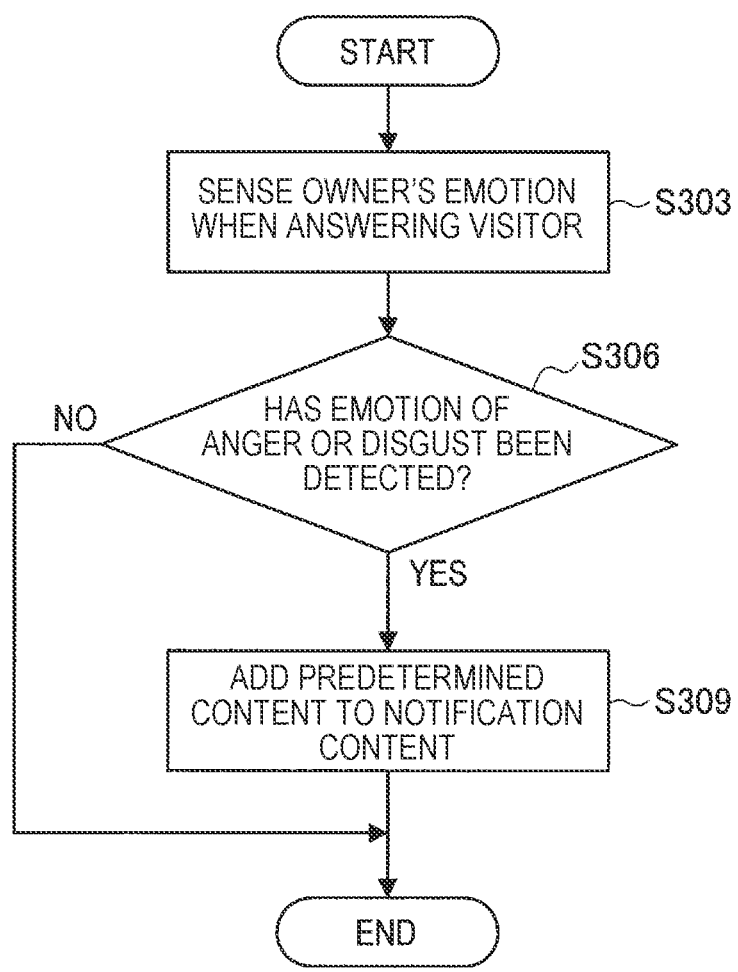
FIG. 16 is a flowchart showing processing of changing a notification content in accordance with a user's emotion according to one embodiment of the present disclosure.

FIG. 16 is a flowchart showing processing of changing a notification content in accordance with a user's emotion according to the present embodiment. As shown in FIG. 16, the emotion sensing section 106 of the pet robot 1 first senses an owner's emotion when answering a visitor (step S303). The emotion sensing section 106 is capable of analyzing a captured image captured by the camera 15 to sense a user's emotion (anger, disgust, fear, happiness, sorrow, or surprise) from the user's expression. For example, the pet robot 1 notifies about the visitor that "A newspaper carrier is coming soon" and then images, with the camera 15, an expression when the user is answering the visitor and monitors the expression to sense what face (expression) is held.

Next, in the case where the user's emotion is "anger" or "disgust" (step S306/Yes), the learning section 103 adds a predetermined content to the notification content (step S309). For example, in the case where the user holds a disgusted face at the time of answering, the expression of "disgust" is sensed, and the learning section 103 adds a notification such as "There is a choice of not answering the door" with the user's emotion taken into consideration to the notification content that "A newspaper carrier is coming soon" when the same visitor is discriminated (update of the notification content). Accordingly, when the newspaper carrier comes next, the pet robot 1 is capable of notifying the user that "A newspaper carrier is coming soon. There is a choice of not answering the door.

Figure 17:
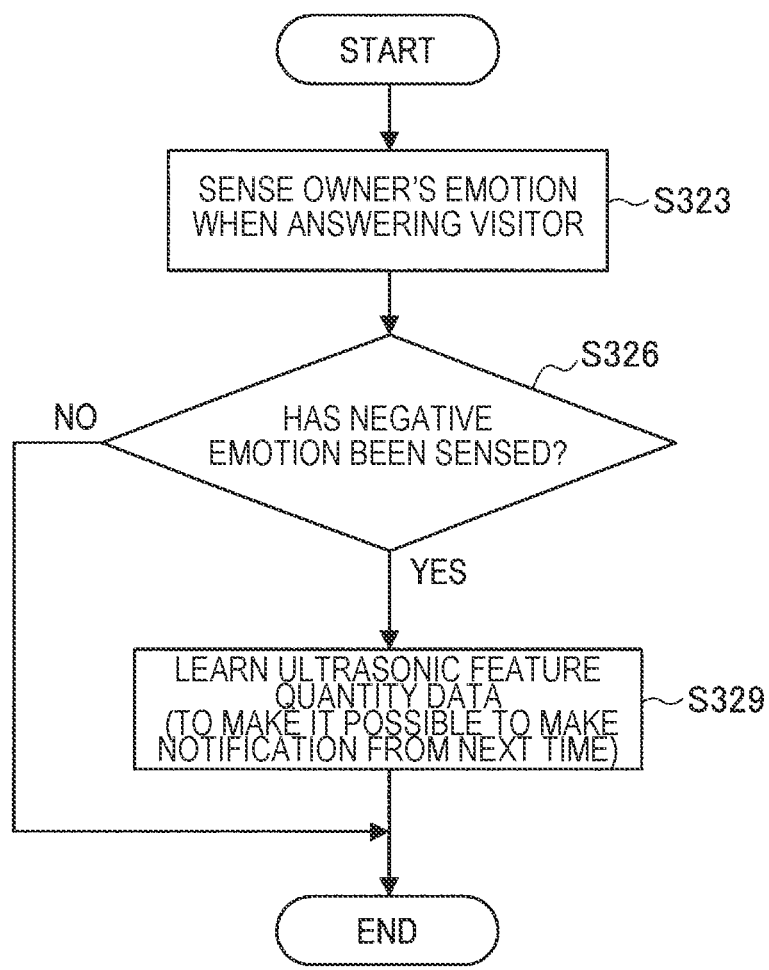
FIG. 17 is a flowchart showing automatic learning processing in accordance with a user's emotion according to one embodiment of the present disclosure.

FIG. 17 is a flowchart showing automatic learning processing in accordance with a user's emotion according to the present embodiment. As shown in FIG. 17, the emotion sensing section 106 of the pet robot 1 first senses an owner's emotion when answering a visitor (step S323). The emotion sensing section 106 is capable of analyzing a captured image captured by the camera 15 to sense a user's emotion (anger, disgust, fear, happiness, sorrow, or surprise) from the user's expression.

Next, in the case where a negative emotion such as "anger", "disgust", "fear", "sorrow", or the like is sensed as the user's emotion (step S306/Yes), the learning section 103 learns ultrasonic feature quantity data so as to be capable of notifying the user in advance from the next time the same visitor comes (step S309). Specific processing of learning is as described above with reference to FIG. 7 (step S118 and step S121 in FIG. 7). In the example described with reference to FIG. 7, learning is performed in the case where there is a command from the user (owner), but can be performed automatically in accordance with the user's emotion in the present embodiment. In this manner, learning is performed so as to notify the user in advance in the case of a visitor who brings a negative emotion, and a prior notification can be made from the next time, so that the user can avoid being surprised at a sudden visit, or can prepare himself/herself when answering a person the user dislikes, for example.

On the other hand, in the case where the user's emotion is not a negative emotion (for example, in the case of a happy emotion or lack of emotion) (step S326/No), the pet robot 1 does not particularly perform learning since there is no need to give a notification in advance.

5. CONCLUSION

As described above, the information processing system according to an embodiment of the present disclosure makes it possible to sense approach of an object and notify a user in advance.

More specifically, the pet robot 1 according to the present embodiment can sense a feel of a person or an object in the vicinity with the passive ultrasonic sensor 17 and notify an owner. In addition, the pet robot 1 is capable of sensing a feel using radio waves or a smell complementarily to ultrasound. In addition, the pet robot 1 can also sense an owner's emotion against a visitor to automatically perform learning.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is also possible to generate a computer program for causing the functions of the pet robot 1 to be exerted in hardware such as a CPU, ROM, and RAM included in the pet robot 1 of the above-described information processing system. In addition, a computer-readable storage medium having the computer program stored thereon is also offered.

In addition, in the above-described embodiment, the pet robot 1 alone performs discrimination of a visitor, emotion sensing, and the like, whilst the present embodiment is not limited to this, but it is also possible to achieve the above-described processing on the server side. That is, in an information processing system including the pet robot 1 and a server (not shown), the pet robot 1 may transmit an ultrasonic signal sensed by the ultrasonic sensor 17 from the communication section 11 to the server, and feature quantity analysis, storage control, learning, discrimination, and notification control may be performed on the server side. In addition, the pet robot 1 may transmit a captured image captured by the camera 15 from the communication section 11 to the server, and a user's emotion may be sensed on the server side. In this manner, a configuration in which the server side has at least part of the functional configuration of the pet robot 1 described in FIG. 3 and FIG. 15 may be adopted.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing device including:
a passive ultrasonic sensor;
a notification section configured to notify a user; and
a control section configured to, when detecting a feature indicating approach of an object learned in advance from sensor data detected by the ultrasonic sensor, control the notification section to notify the user.

(2)

The information processing device according to (1), further including:
a command acquisition section configured to acquire a command from the user, in which
when recognizing that a specific command has been acquired by the command acquisition section, the control section exerts control to generate teacher data for recognizing an approaching object on a basis of sensor data detected since a time point going back a predetermined period and to store the teacher data in a storage section.

(3)

The information processing device according to (2), in which
the control section detects a feature similar to the teacher data from the sensor data detected by the ultrasonic sensor, and controls the notification section to notify the user that an object approaches, and
when recognizing that a command indicating a positive evaluation has been acquired by the command acquisition section in response to the notification, the control section updates the teacher data on a basis of the sensor data detected by the ultrasonic sensor.

(4)

The information processing device according to (2) or (3), in which
the teacher data is data indicating a feature of chronological sensor data since the time point going back the predetermined period.

(5)

The information processing device according to (4), in which when recognizing that a command requesting a still earlier notification has been acquired by the command acquisition section in response to the notification, the control section updates the teacher data on a basis of data indicating a feature of chronological sensor data since a time point going back further than the predetermined period.

(6)

The information processing device according to (4) or (5), in which
when features similar to the teacher data are successively detected from the chronological sensor data detected by the ultrasonic sensor, the control section controls the notification section to notify the user that an object approaches.

(7)

The information processing device according to any one of (4) to (6), in which
a feature detected from the sensor data is a state transition or a waveform.

(8)

The information processing device according to any one of (1) to (6), further including:
a radio wave receiving section, in which
when detecting a feature indicating approach of an object, learned in advance, in the sensor data detected by the ultrasonic sensor and a radio wave signal received by the radio wave receiving section, the control section controls the notification section to notify the user.

(9)

The information processing device according to (8), in which
the control section
performs, after first recognition processing of recognizing an approaching object in accordance with an ID included in the radio wave signal, second recognition processing of recognizing the approaching object in accordance with a feature included in the sensor data detected by the ultrasonic sensor, and
exerts control to notify the user about the approaching object in accordance with coincidence between results of the first recognition processing and the second recognition processing.

(10)

The information processing device according to any one of (1) to (9), further including:
a smell sensor, in which
when detecting a feature indicating approach of an object, learned in advance, from the sensor data detected by the ultrasonic sensor and smell data detected by the smell sensor, the control section controls the notification section to notify the user.

(11)

The information processing device according to (10), in which
smell data and an approaching object are associated in advance, ultrasonic sensor data and the approaching object are associated in advance, and
the control section exerts control to recognize the approaching object in accordance with the smell data, recognize the approaching object in accordance with the ultrasonic sensor data, and notify the user about the approaching object in accordance with coincidence between the two recognition results.

(12)

The information processing device according to any one of (1) to (11), further including:

an imaging section configured to image a face of the user, in which the control section estimates an emotion of the user from a face image of the user captured by the imaging section when the user answers a visitor serving as the object, and updates a content to be notified by the notification section in accordance with a result of estimation of the emotion.

(13)

The information processing device according to any one of (1) to (12), further including:

an imaging section configured to image a face of the user, in which the control section estimates an emotion of the user from a face image of the user captured by the imaging section when the user answers a visitor serving as the object, and in accordance with a result of the estimation after the user answers the visitor, on a basis of sensor data detected since a time point going back a predetermined period from that time point, the control section exerts control to generate teacher data for recognizing the visitor, and to store the teacher data in a storage section.

(14)

A storage medium having a program stored thereon, the program causing a computer to function as a control section configured to control a notification section to notify a user when detecting a feature indicating approach of an object learned in advance from sensor data detected by a passive ultrasonic sensor.

REFERENCE SIGNS LIST 1 pet robot
10 control section
11 communication section
15 camera
16 sound input section
17 ultrasonic sensor
18 driving section
19 touch sensor
20 storage section
22 sound output section
23 acceleration sensor
24 angular velocity sensor
25 smell sensor
101 feature quantity analysis section
102 storage control section
103 learning section
104 discrimination section
105 notification control section
106 emotion sensing section
210 feature quantity database
220 discrimination data storage section

What is claimed is:

1. An information processing apparatus, comprising: circuitry configured to:

detect feature quantity data for each piece of sensor data detected in a chronological order by a passive ultrasonic sensor, wherein the detected feature quantity data indicates an approach of an object, and the approach of the object is learned in advance;

compare the detected feature quantity data for the each piece of the sensor data detected in the chronological order with teacher data stored in a storage section;

identify the object based on the comparison; and control a notification to a user based on the identified object, wherein the notification indicates the approach of the object.

2. The information processing apparatus according to claim 1, wherein the circuitry is further configured to classify an event indicated by the detected feature quantity data for the each piece of the sensor data detected in the chronological order based on the comparison, and each classified event is associated with the object.

3. The information processing apparatus according to claim 2, wherein the circuitry is further configured to:

detect an order of transition of the classified event for the each piece of the sensor data detected in the chronological order; and identify the object based on the detected order of transition.

4. The information processing apparatus according to claim 1, further comprising the passive ultrasonic sensor configured to detect the sensor data.

5. The information processing apparatus according to claim 1, wherein the circuitry is further configured to:

acquire a first command from the user;

recognize that the acquired first command is a specific command;

generate the teacher data based on the recognition that the acquired first command is the specific command, wherein the teacher data is generated based on the sensor data detected in the chronological order since a first time point going back a specific time period, and the teacher data is for recognition of the object approaching; and store the generated teacher data in the storage section.

6. The information processing apparatus according to claim 5, wherein the teacher data indicates a feature of the sensor data detected in the chronological order since the first time point going back the specific time period.

7. The information processing apparatus according to claim 5, wherein the circuitry is further configured to:

acquire a second command from the user based on the notification to the user;

recognize that the acquired second command indicates a request for an earlier notification; and update the generated teacher data based on the recognition that the acquired second command indicates the request for the earlier notification, wherein the teacher data is updated based on the feature quantity data of the sensor data detected in the chronological order since a second time point going back further than the specific time period, and the second time point is before the first time point.

8. The information processing apparatus according to claim 1, wherein the circuitry is further configured to:

detect that the feature quantity data is similar to the teacher data;

control the notification to the user based on the detection that the feature quantity data is similar to the teacher data, wherein the notification indicates the approach of the object;

acquire a second command from the user based on the notification to the user;

recognize that the acquired second command indicates a positive evaluation; and update, based on the recognition that the second command indicates the positive evaluation, the teacher data generated based on the sensor data detected in the chronological order by the passive ultrasonic sensor.

9. The information processing apparatus according to claim 1, wherein the detected feature quantity data is a waveform.

10. The information processing apparatus according to claim 1, further comprising a radio wave receiver configured to receive a radio wave signal.

11. The information processing apparatus according to claim 10, wherein the circuitry is further configured to:
detect the feature quantity data based on the sensor data detected by the passive ultrasonic sensor and the radio wave signal received by the radio wave receiver; and
control the notification to the user.

12. The information processing apparatus according to claim 10, wherein the circuitry is further configured to:
execute a first recognition process to recognize the object based on an ID included in the received radio wave signal;
execute a second recognition process to recognize the object based on the detected feature quantity data, wherein the second recognition process is executed after the first recognition process; and
control the notification to the user based on a coincidence between a result of the first recognition process and a result of the second recognition process.

13. The information processing apparatus according to claim 1, further comprising
a smell sensor configured to detect smell data, wherein the circuitry is further configured to:
detect the feature quantity data based on the sensor data detected by the passive ultrasonic sensor and the smell data detected by the smell sensor; and
control the notification to the user.

14. The information processing apparatus according to claim 13, wherein
the smell data and the object are associated in advance, the sensor data and the object are associated in advance, and
the circuitry is further configured to:
execute a first recognition process to recognize the object based on the smell data;
execute a second recognition process to recognize the object based on the sensor data; and
control the notification to the user based on a coincidence between a result of the first recognition process and a result of the second recognition process.

15. The information processing apparatus according to claim 1, further comprising
a camera configured to capture an image of a face of the user at a time when the user answers a visitor, wherein the visitor serves as the object, and
the circuitry is further configured to:
estimate an emotion of the user from the captured image of the face of the user; and
update a content of the notification to the user based on a result of the estimation of the emotion of the user.

16. The information processing apparatus according to claim 1, further comprising
a camera configured to capture an image of a face of the user at a first time point when the user answers a visitor, wherein
the visitor serves as the object, and
the circuitry is further configured to:
estimate an emotion of the user based on the captured image of the face of the user;
generate the teacher data based on a result of the estimation and the sensor data detected in the chronological order since a second time point going back a specific time period from the first time point, wherein the generated teacher data is for recognition of the visitor; and
store the generated teacher data in the storage section.

17. An information processing method, comprising:
in an information processing apparatus comprising circuitry:
detecting feature quantity data for each piece of sensor data detected in a chronological order by a passive ultrasonic sensor, wherein
the detected feature quantity data indicates an approach of an object, and the approach of the object is learned in advance;
comparing the detected feature quantity data for the each piece of the sensor data detected in the chronological order with teacher data stored in a storage section;
identifying the object based on the comparison; and
controlling a notification to a user based on the identified object, wherein the notification indicates the approach of the object.

18. A non-transitory computer-readable medium having stored thereon computer-executable instructions which, when executed by a processor of an information processing apparatus, cause the processor to execute operations, the operations comprising:
detecting feature quantity data for each piece of sensor data detected in a chronological order by a passive ultrasonic sensor, wherein
the detected feature quantity data indicates an approach of an object, and the approach of the object is learned in advance;
comparing the detected feature quantity data for the each piece of the sensor data detected in the chronological order with teacher data stored in a storage section;
identifying the object based on the comparison; and
controlling a notification to a user based on the identified object, wherein the notification indicates the approach of the object.

* * * * *